United States Patent
Yang et al.

(10) Patent No.: US 11,121,564 B2
(45) Date of Patent: Sep. 14, 2021

(54) POWER SUPPLY DEVICE HAVING HIERARCHICAL STRUCTURE

(71) Applicant: Electronics and Telecommunications Research Institute, Daejeon (KR)

(72) Inventors: Yil Suk Yang, Daejeon (KR); Jimin Oh, Daejeon (KR); Young-Gi Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 239 days.

(21) Appl. No.: 16/248,864

(22) Filed: Jan. 16, 2019

(65) Prior Publication Data
US 2019/0245357 A1    Aug. 8, 2019

(30) Foreign Application Priority Data

Feb. 6, 2018  (KR) ........................ 10-2018-0014781
May 31, 2018  (KR) ........................ 10-2018-0062976

(51) Int. Cl.
*H02J 7/00* (2006.01)

(52) U.S. Cl.
CPC .................................. *H02J 7/0021* (2013.01)

(58) Field of Classification Search
CPC .... H02J 7/0021; H02J 7/34; H02J 7/00; H02J 2207/40
See application file for complete search history.

(56) References Cited

U.S. PATENT DOCUMENTS

| | | | |
|---|---|---|---|
| 6,045,398 A * | 4/2000 | Narita | C07D 401/06 439/500 |
| 8,378,622 B2 | 2/2013 | Yang et al. | |
| 9,088,162 B2 | 7/2015 | Shu et al. | |
| 9,812,732 B2 | 11/2017 | Jiang et al. | |
| 9,882,403 B2 | 1/2018 | Lu et al. | |
| 2013/0154355 A1 | 6/2013 | An et al. | |
| 2013/0293006 A1* | 11/2013 | Kang | H02J 1/10 307/10.1 |
| 2014/0203780 A1* | 7/2014 | Hu | H02J 7/0013 320/112 |
| 2019/0123547 A1* | 4/2019 | Yasunori | H02H 1/0007 |

FOREIGN PATENT DOCUMENTS

KR     10-1497602 B1    3/2015
KR  10-2018-0008118 A   1/2018

* cited by examiner

*Primary Examiner* — Jared Fureman
*Assistant Examiner* — Aqeel Bukhari
(74) *Attorney, Agent, or Firm* — Rabin & Berdo, P.C.

(57) ABSTRACT

Provided is a power supply device for supplying power to load elements. The power supply device includes a main power module including a main battery, a main power controller configured to control charging and discharging of the main power module, a sub-power module including sub-batteries respectively corresponding to the load elements, and a sub-power controller configured to control charging and discharging of the sub-power module, Based on a remaining capacity of the main battery and a remaining capacity of the sub-batteries, the power supply device is selectively operated in a first mode in which charging and discharging are possible for both the main power module and the sub-power module, a second mode in which charging and discharging are possible only for the sub-power module, or a third mode in which charging and discharging are possible only for the main power module.

17 Claims, 6 Drawing Sheets

First Operation Mode

Second Operation Mode

POWER SUPPLY DEVICE HAVING HIERARCHICAL STRUCTURE

CROSS-REFERENCE TO RELATED APPLICATIONS

This U.S. non-provisional patent application claims priority under 35 U.S.C. § 119 of Korean Patent Application Nos. 10-2018-0014781, filed on Feb. 6, 2018, and 10-2018-0062976, filed on May 31, 2018, the entire contents of which are hereby incorporated by reference.

BACKGROUND

The present disclosure herein relates to a power supply device, and more particularly, to a power supply device having a hierarchical structure.

A power supply device consisting of a power source and a power controller may supply power to the load element by transforming the power supplied from the power source. The power source may include, for example, a battery, an AC power source, a USB power source, or an energy harvester. The power controller may include, for example, a switch mode power supply (SMPS) type PMIC, a low dropout (LDO) type PMIC, a battery charger, a USB charger, an energy harvester circuit, a battery state of charge (SOC) monitoring circuit, or a battery cell balancing circuit.

A power supply device of a portable terminal such as a smart phone, a notebook computer, etc. may be configured with one battery and several power controllers to supply power to the load element. AC power, USB power, and energy harvester may be used as the power source, but the battery may be used as the main power source.

Since the power supply device of the portable terminal has a single layer structure that supplies power from one main battery to several load elements, increase of the number of charging due to battery usage time and limitation of service may occur. In addition, various issues such as limit of battery capacity, safety, increase in area due to an increase in the number of parts required for power supply, efficiency, and price have arisen.

SUMMARY

The present disclosure is to provide a hierarchical structure power supply device that operates efficiently according to various operation modes.

An embodiment of the inventive concept provides a power supply device for supplying power to load elements, the device including: a main power module including a main battery; a main power controller configured to control charging and discharging of the main power module; a sub-power module including sub-batteries respectively corresponding to the load elements; and a sub-power controller configured to control charging and discharging of the sub-power module, wherein based on a remaining capacity of the main battery and a remaining capacity of the sub-batteries, the power supply device is selectively operated in a first mode in which charging and discharging are possible for both the main power module and the sub-power module, a second mode in which charging and discharging are possible only for the sub-power module, or a third mode in which charging and discharging are possible only for the main power module.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Below, in order for the inventive concept to be easily implemented by those skilled in the art, some embodiments will be described in detail and with reference to the accompanying drawings.

Hereinafter, the term "module" used in the specification may mean a hardware component such as Field Programmable Gate Array (FPGA) or Application Specific Integrated Circuit (ASIC), a set of hardware components, or a circuit.

Figure 1:
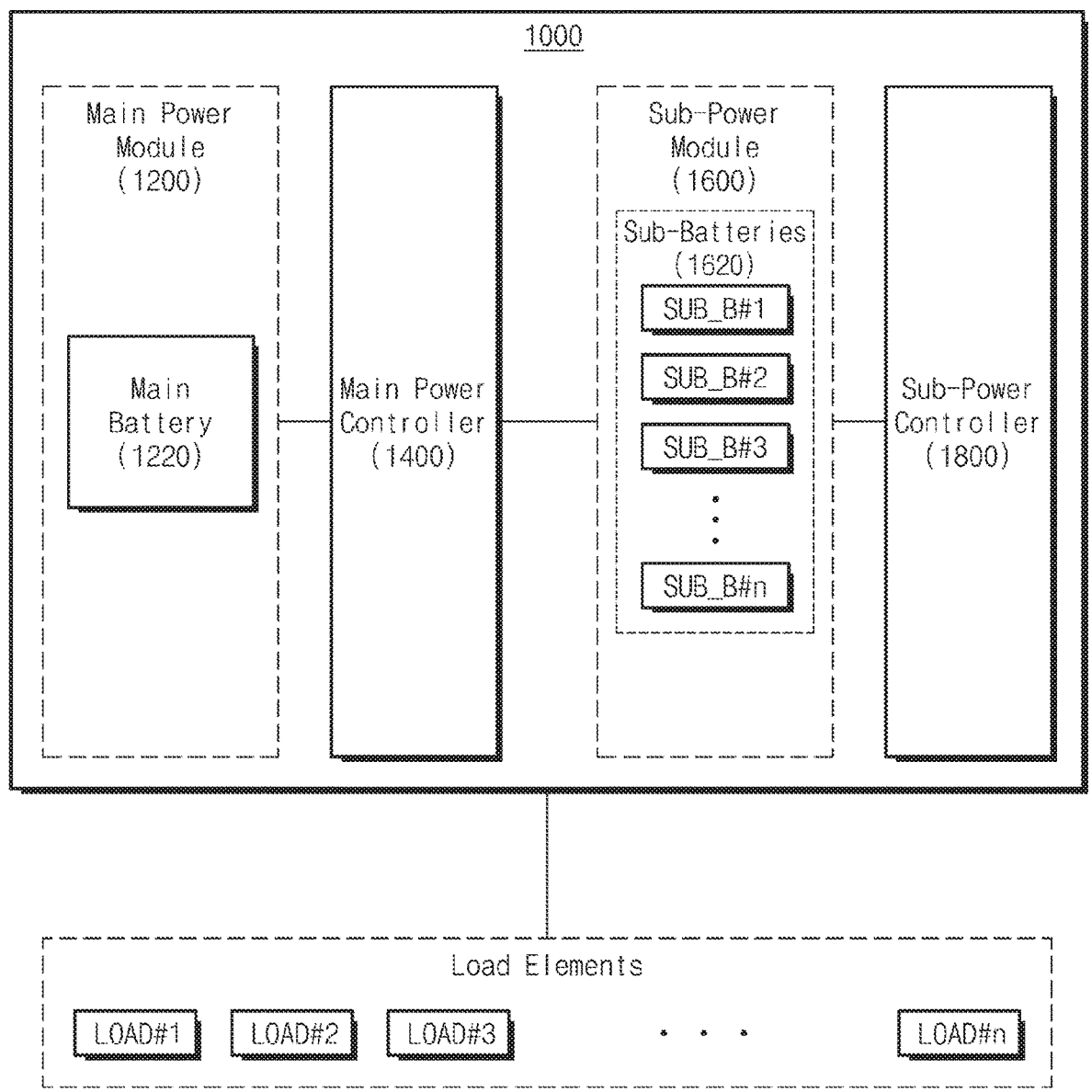
FIG. 1 shows a block diagram of a power supply device according to an embodiment.

FIG. 1 shows a block diagram of a power supply device according to an embodiment.

The power supply device 1000 may supply power to a plurality of load elements. Each of the load elements may be, for example, an AP core, a memory, a peripheral device, a sensor, a display, and an input/output port, but is not limited thereto.

Referring to FIG. 1, a power supply device 1000 may include a main power module 1200, a main power controller 1400, a sub-power module 1600, and a sub-power controller 1800.

The main power module 1200 may include at least one power source for supplying power to the outside. For example, the main power module 1200 may include a main battery 1220 as a power source. The main power module 1200 according to an embodiment may further include other power sources (not shown) such as a USB power source, an AC power source, an energy harvester, and the like. Using power supplied through the other power sources in the main power module 1200, the main battery 1220 may be charged or powered by the sub-power module 1600 and the load elements.

The main power controller 1400 may control charging and discharging operations of the main power module 1200. For example, the main power controller 1400 may include a battery state of charge (SOC) monitoring circuit (not shown) for monitoring the SOC of the main battery 1220. Also, the main power controller 1400 may include a Power Management IC (PMIC) (not shown) for controlling the discharge power from the main power module 1200 and delivering the discharge power to the sub-power module 1600 or the load elements. The PMIC included in the main power controller 1400 may be a Switch Mode Power Supply (SMPS) type or a Low Drop Out (LDO) type, but is not limited thereto.

The main power controller 1400 may appropriately transform the power discharged from the main battery 1220 and deliver the transformed power to the sub-power module 1600 and the load elements. In addition, the main power controller 1400 may charge the main battery 1220 through other power sources such as a USB power source, an AC power source, an energy harvester, etc. of the main power module 1200.

The sub-power module 1600 may include sub-batteries 1620. The sub-batteries 1620 may correspond to the load elements, respectively. For example, the first sub-battery SUB_B #1 and the second sub-battery SUB_B #2 may supply power to the first load element LOAD #1 and the second load element LOAD #2, respectively. According to an embodiment, each of the sub-batteries 1620 may have a fixed operating voltage and storage capacity. Alternatively, each of the sub-batteries 1620 may vary in operating voltage and storage capacity to be specific to the corresponding load element, but is not limited thereto.

The sub-power controller 1800 may control the charging and discharging operations of the sub-power module 1600. For example, the sub-power controller 1800 may include a battery SOC monitoring circuit (not shown) for monitoring the SOC of each of the sub-batteries 1620. For example, the sub-power controller 1800 may include a PMIC for controlling the power discharged from the sub-power module 1600 and for delivering the discharged power to the load elements. The PMIC included in sub-power controller 1800 may have SMPS type or LDO type, but is not limited thereto.

The sub-power controller 1800 may appropriately transform the power discharged from each of the sub-batteries 1620 and deliver the transformed power to the load elements. In addition, by monitoring the charging state of each of the sub-batteries 1620, the sub-power controller 1800 may control the sub-power module 1600 to perform mutual charging between the sub-batteries 1620. For example, the second sub-battery SUB_B #2 whose charging state is equal to or less than the threshold value may be charged using the third sub-battery SUB_B #3 having a margin for the charge capacity. In this case, the sub-power controller 1800 may charge the second sub-battery SUB_B #2 by supplying the discharge power from the third sub-battery SUB_B #3 to the second sub-battery SUB_B #2.

The main power controller 1400 and the sub-power controller 1800 according to an embodiment may include an ASIC, an FPGA, an embedded processor, a microprocessor, hardware control logic, a hardware finite state machine (FSM), or a combination thereof.

The power supply device 1000 may be operated according to a plurality of operation modes for efficiency of power operation. The plurality of operation modes may include a first operation mode (also referred to as a hierarchical structure battery operation management mode) using both the main power module 1200 and the sub-power module 1600, a second operation mode (also referred to as a sub-battery operation management mode) using only the sub-power module 1600 among the main power module 1200 and the sub-power module 1600, and a third operation mode (also referred to as a main battery operation management mode) using only the main power module 1200 among the main power module 1200 and the sub-power module 1600. The power supply device 1000 determines one of the first operation mode, the second operation mode, and the third operation mode as the current operation mode based on the remaining capacity of the main battery 1200 and the remaining capacity of the sub-batteries 1600. Hereinafter, operations that may be performed in the power supply device 1000 according to respective operation modes will be described in detail below with reference to FIGS. 2 to 6.

Figure 2:
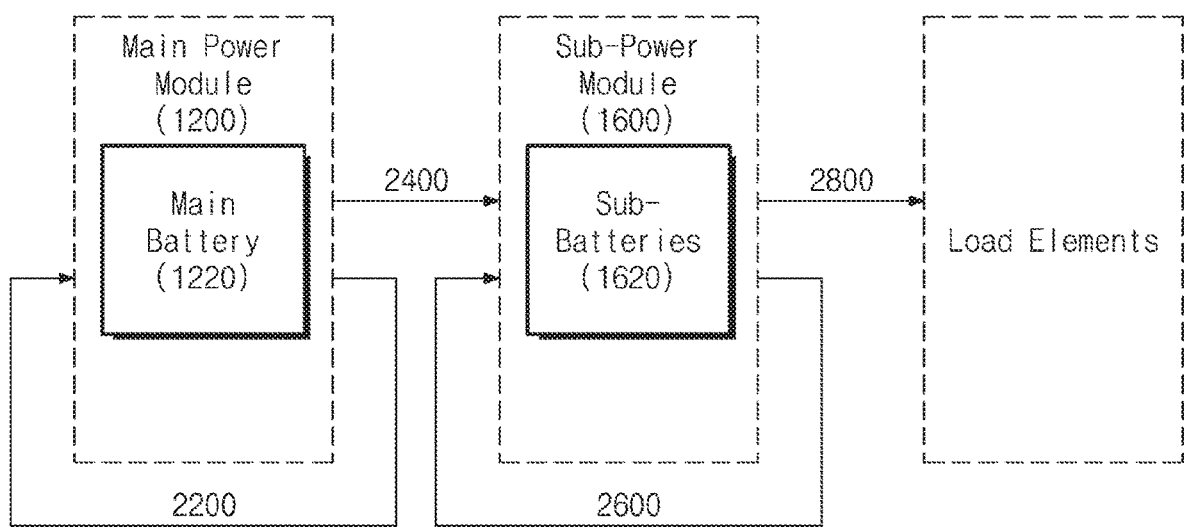
FIG. 2 is a conceptual diagram illustrating operations that may be performed when a power supply device of FIG. 1 according to an embodiment is operated in a first operation mode.

FIG. 2 is a conceptual diagram illustrating operations that may be performed when the power supply device 1000 according to an embodiment is operated in the first operation mode. For convenience of explanation, the main power controller 1400 and the sub-power controller 1800 are omitted in FIG. 2.

According to an embodiment, in the first operation mode, the power applied to the load element may first be supplied from the sub-power module 1600. If the remaining capacity of the sub-power module 1600 is insufficient, the sub-batteries 1620 may be charged with the power discharged from the main power module 1200, or the mutual charging between the sub-batteries 1620 may be performed.

Referring to FIG. 2, the power supply device 1000 may perform at least one of an operation 2200 for charging the main battery 1220, an operation 2400 for charging the sub-batteries 1620 using the discharge power from the main power module 1200, a mutual charging operation 2600 between sub-batteries 1620, and an operation 2800 for supplying power discharged from the sub-power module to load elements.

Figure 3:
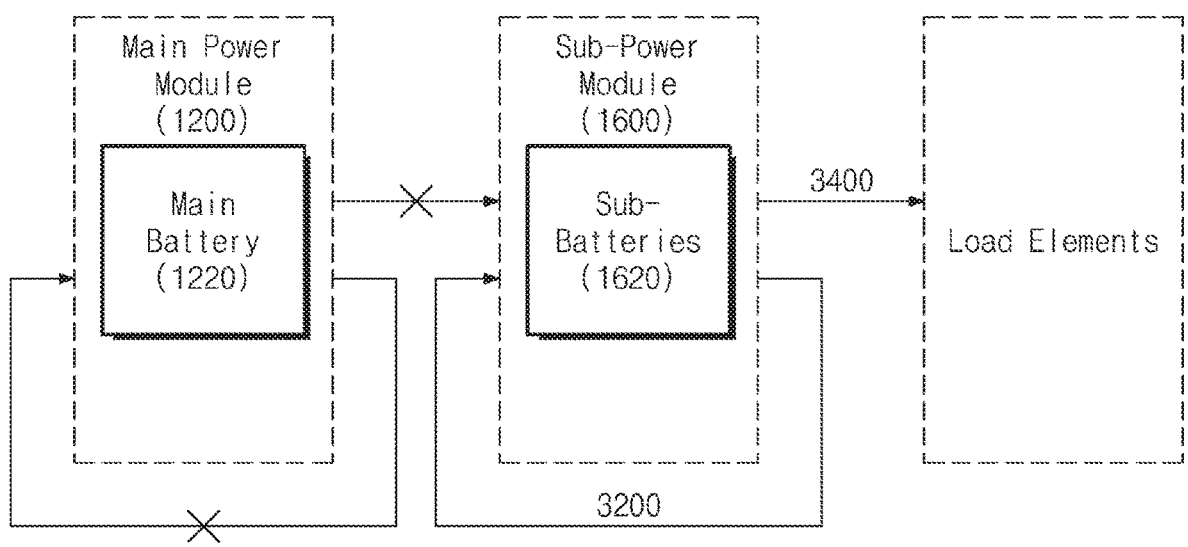
FIG. 3 is a conceptual diagram illustrating operations that may be performed when a power supply device of FIG. 1 according to an embodiment is operated in a second operation mode.

FIG. 3 is a conceptual diagram illustrating operations that may be performed when the power supply device 1000 according to an embodiment is operated in the second operation mode. For convenience of explanation, the main power controller 1400 and the sub-power controller 1800 are omitted in FIG. 3.

According to an embodiment, in the second operation mode, the power applied to the load element may be supplied from the sub-power module 1600. If the remaining capacity of a particular sub-battery is insufficient, mutual charging between the sub-batteries 1620 may be performed.

Referring to FIG. 3, when the power supply device 1000 is operated in the second operation mode, the power supply device 1000 may perform at least one of a mutual charging operation 3200 between the sub-batteries 1620 and an operation 3400 of supplying the load element with power discharged from the sub-power module 1600. Since the second operation mode is a mode in which the main power module 1200 is not used, charging of the main battery 1220 or discharging from the main power module 1200 is not performed.

Figure 4:
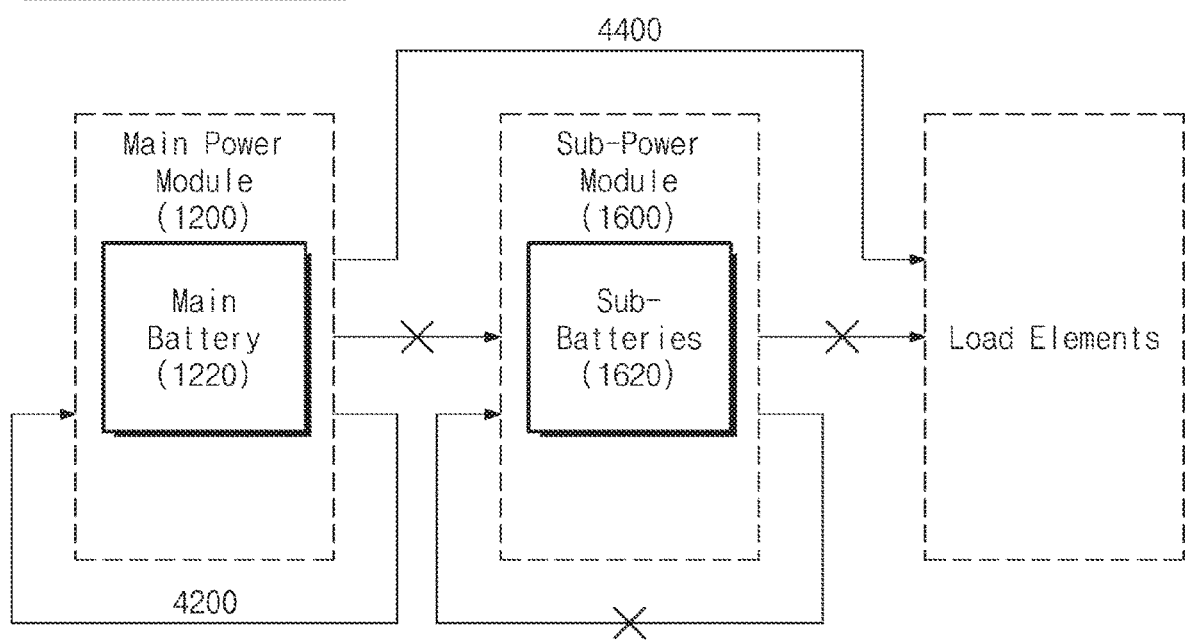
FIG. 4 is a conceptual diagram illustrating operations that may be performed when a power supply device of FIG. 1 according to an embodiment is operated in a third operation mode.

FIG. 4 is a conceptual diagram illustrating operations that may be performed when the power supply device 1000 according to an embodiment is operated in the third operation mode. For convenience of explanation, the main power controller 1400 and the sub-power controller 1800 are omitted in FIG. 4.

According to an embodiment, in the third operation mode, the power applied to the load element may be supplied from the main power module 1200. When the remaining capacity of the main battery 1220 is insufficient, the main battery 1220 may be charged through the AC power source, the USB power source, and the energy harvester power source.

Referring to FIG. 4, when the power supply device 1000 is operated in the third operation mode, the power supply device 1000 may perform at least one of an operation 4200 for charging the main battery 1220 and an operation 4400 for supplying the discharge power from the main power module 1200 to the load elements. Since the third operation mode is a mode in which the sub-power module 1600 is not used, charging or discharging of the sub-batteries 1620 is not performed.

Figure 5:
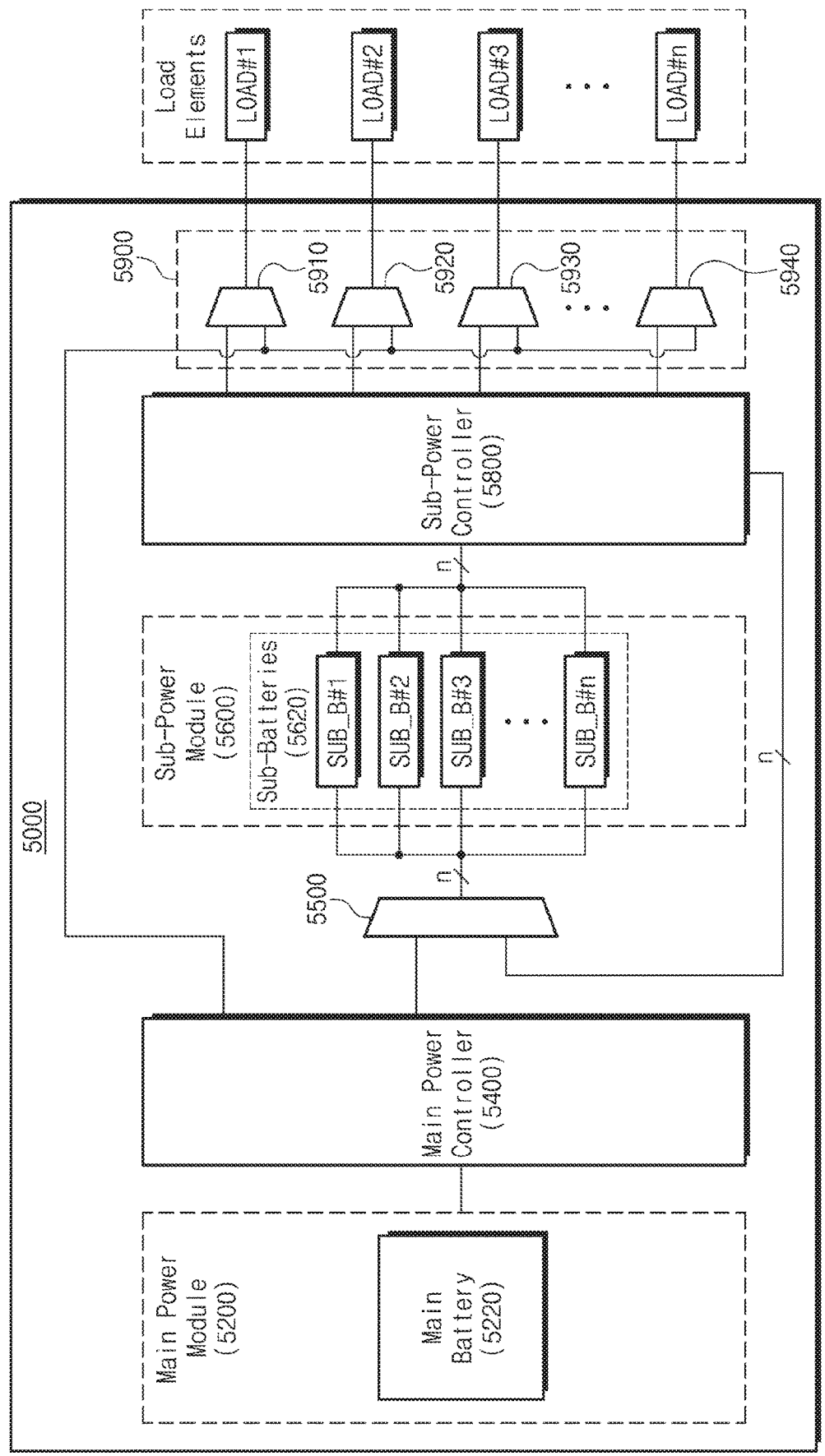
FIG. 5 shows a detailed block diagram of a power supply device according to an embodiment.

FIG. 5 shows a detailed block diagram of a power supply device according to an embodiment.

The power supply device 5000 shows a detailed embodiment of the power supply device 1000 described above with reference to FIG. 1. Therefore, even if there are contents omitted below, the contents described with respect to the main power module 1200, the main power controller 1400, the sub-power module 1600, and the sub-power controller 1800 of FIG. 1 may be applied to the main power module 5200, the main power controller 5400, the sub-power module 5600, and the sub-power controller 5800.

Referring to FIG. 5, the power supply device 5000 may further include a first selector 5500 and a second selector 5900, as compared to the power supply device 1000 of FIG. 1.

The first selector 5500 may receive the power discharged from the main power controller 5400 and the power discharged from the sub-power controller 5800 and selectively output one power to the sub-power module 5600. The power outputted from the first selector 5500 to the sub-power module 5600 may be used to charge the sub-batteries 5620. For example, the first selector 6500 may be implemented as a multiplexer, but is not limited thereto.

According to an embodiment, when the power supply device 5000 operates in a second operation mode in which the main power module 5200 is not used, the first selector 5500 may output the power received from the sub-power controller 5800 under the received control signal. In this case, each of the sub-batteries 5620 may be charged using only the mutual charging between the sub-batteries 5620, without using the discharge power from the main power module 5200.

The second selector 5900 may receive the power discharged from the main power controller 5400 and the power discharged from the sub-power controller 5800 and selectively output one power to the load elements. The second selector 5900 may include multiplexers 5910, 5920, 5930, and 5940 that correspond respectively to the load elements. For example, the multiplexer 5910 may output one of the power discharged from the sub-power controller 5800 and the power discharged from the main power controller 5400 to the load element LOAD #1.

According to an embodiment, when the power supply device 5000 is operated in the third operation mode in which the sub-power module 5600 is not used, each of the multiplexers 5910, 5920, 5930, and 5940 of the second selector 5900 may output the power received from the main power controller 5400 under the received control signal. In this case, the load elements are supplied with power from the main power module 5200.

Figure 6:
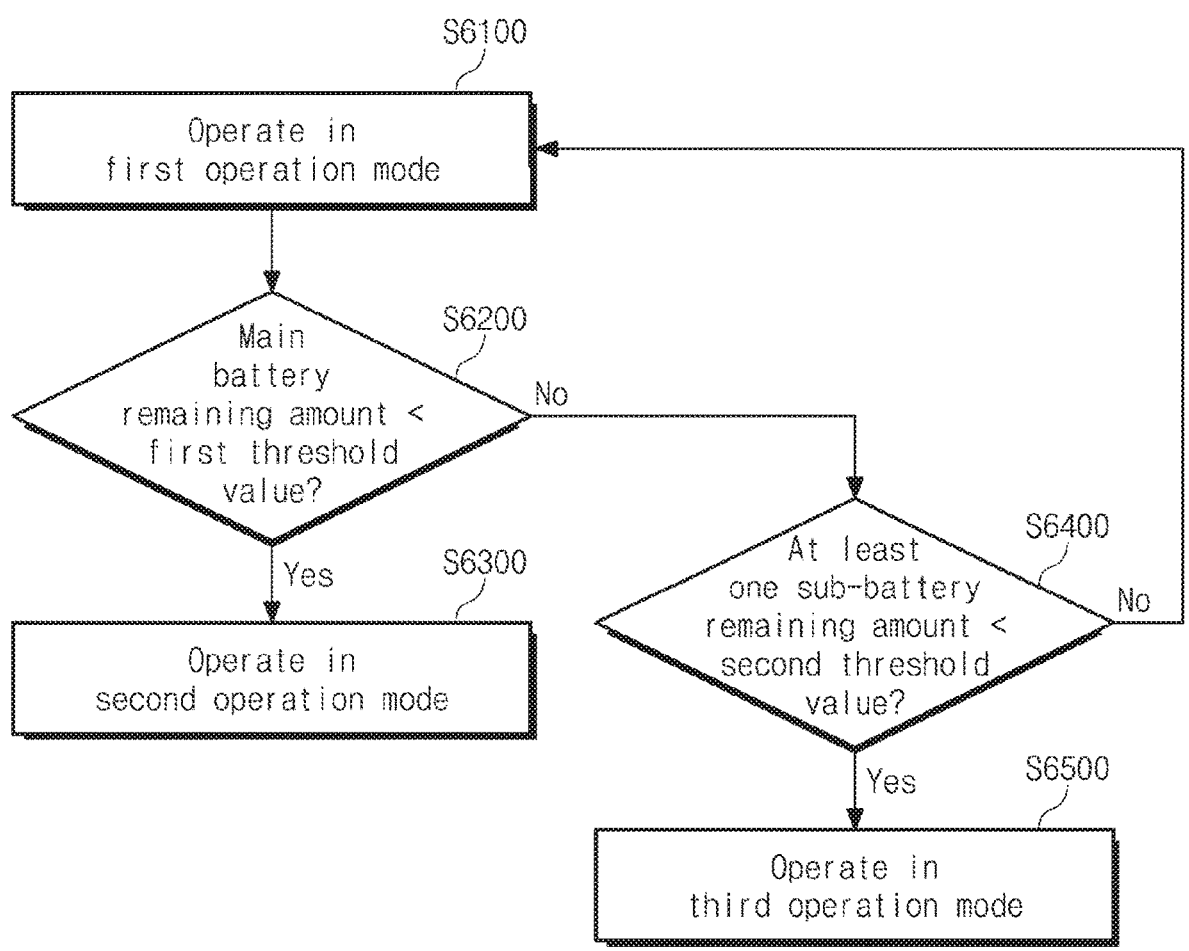
FIG. 6 is a flowchart illustrating a method for determining the operation mode of a power supply device 1000 of FIG. 1 according to an embodiment.

FIG. 6 is a flowchart illustrating a method for determining the operation mode of the power supply device 1000 of FIG. 1 according to an embodiment.

In operation S6100, the power supply device 1000 may perform various operations according to the first operation mode. The first operation mode may be the base operation mode of the power supply device 1000. The power supply device 1000 may operate in one of the first to sixth sub-operation modes. Hereinafter, the sub-operation modes may be determined according to the remaining capacity of the main battery 1220 and the sub-batteries 1620 and the standby/operation state of the load elements, but is not limited thereto.

In the first sub-operation mode (also called Hierarchy Battery Discharging Operation Mode), the power supply device 1000 supplies the discharge power from the main power module 1200 to the sub-power module 1600 while charging the main battery 1220 and supplies the discharge power from the sub-power module 1600 to the load elements.

In the second sub-operation mode (also called Hierarchy Battery Charging Operation Mode), the power supply device 1000 may charge the sub-power module 1600 using the discharge power of the main power module 1200. For example, the sub-batteries 1620 may be charged through the main battery 1220, the AC power, the USB power, or the energy harvester power. At this time, charging of the main battery 1220 and power supply to the load elements are not performed.

In the third sub-operation mode (also called hierarchy battery charging/discharging operation mode), the power supply device 1000 may supply the discharge power from the sub-power module 1600 to the load elements while charging the sub-batteries 1620 using the discharge power of the main power module 1200.

In the fourth sub-operation mode (also called sub-battery stand-alone discharging operation mode), the power supply device 1000 may supply the discharge power from the sub-power module 1600 to the load elements. At this time, charging of the main battery 1220 and the sub-batteries 1620 and discharging from the main power module 1200 are not performed.

In the fifth sub-operation mode (also called sub-battery stand-alone charging operation mode), the power supply device 1000 may perform mutual charging between the sub-batteries 1620 of the sub-power module 1600. At this time, charging of the main battery 1220 and discharging from the main power module 1200 are not performed, and power is not supplied to the load elements.

In the sixth sub-operation mode (also called sub-battery stand-alone charging/discharging operation mode), the power supply device 1000 may perform mutual charging between the sub-batteries 1620 and simultaneously supply the discharge power from the sub-power module 1600 to the load elements. At this time, charging of the main battery 1220 and discharging from the main power module 1200 are not performed.

The above-described first to sixth sub-operation modes are examples of various operation modes available in the power supply device 1000 of the first operation mode, but are not limited thereto.

In operation S6200, the power supply device 1000 may determine whether the remaining capacity of the main battery 1220 is less than a first threshold value. If the remaining capacity of the main battery 1220 is less than the first threshold value (Yes), the power supply device 1000 may determine the current operation mode as the second operation mode in which the main power module 1200 is not used and perform various operations in the second operation mode in operation S6300. If the remaining capacity of the main battery 1220 is not smaller than the first threshold value (No), the power supply device 1000 may determine other conditions in operation S6400.

In operation S6300, the power supply device 1000 may perform various operations according to the second operation mode. For example, the power supply device 1000 may operate in one of the seventh to ninth sub-operation modes. As described above, since the second operation mode is a mode in which the main power module 1200 is not used, charging of the main battery 1220 or discharging from the main power module 1200 is not performed.

In the seventh sub-operation mode (also called sub-battery stand-alone discharging operation mode), the power supply device 1000 may supply the discharge power from the sub-power module 1600 to the load elements. At this time, mutual charging between the sub-batteries 1620 is not performed.

In the eighth sub-operation mode (also called sub-battery stand-alone charging operation mode), the power supply device 1000 may perform mutual charging between the sub-batteries 1620. At this time, no power is supplied to the load elements.

In the ninth sub-operation mode (also called sub-battery stand-alone charging/discharging operation mode), the power supply device 1000 may perform mutual charging between the sub-batteries 1620 and simultaneously supply the discharge power from the sub-power module 1600 to the load elements.

The above-described seventh to ninth sub-operation modes are examples of various operation modes available in the power supply device 1000 of the second operation mode, but are not limited thereto.

In operation S6400, the power supply device 1000 may determine whether the remaining capacity of at least one of the sub-batteries 1600 is less than a second threshold value. If the remaining capacity of at least one of the sub-batteries 1600 is less than the second threshold value (Yes), the power supply device 1000 may perform various operations in the third operation mode in operation S6500. If the remaining capacity of all sub-batteries 1600 is greater than or equal to the second threshold value (No), the power supply device 1000 may continue to operate in the first operation mode (S6100).

In operation S6500, the power supply device 1000 may perform various operations according to the third operation mode. For example, the power supply device 1000 may operate in one of the tenth to twelfth sub-operation modes. As described above, since the third operation mode is a mode in which the sub-power module 1600 is not used, charging or discharging of the sub-batteries 1620 is not performed.

In the tenth sub-operation mode (also called main battery stand-alone discharging operation mode), the power supply device 1000 may supply the discharge power from the main power module 1200 to the load elements. At this time, charging of the main battery 1220 is not performed.

In the eleventh sub-operation mode (also called main battery stand-alone charging operation mode), the power supply device 1000 may charge the main battery 1220. For example, the main power controller 1400 may charge the main battery 1220 using an AC power source, a USB power source, and an energy harvester power source. At this time, discharging from the main power module 1200 is not performed.

In the twelfth sub-operation mode (also called main battery stand-alone charging/discharging operation mode), the discharge power from the main power module 1200 may be supplied to the load elements while charging the main battery 1220.

The above-described tenth to twelfth sub-operation modes are examples of various operation modes available in the power supply device 1000 of the third operation mode, but are not limited thereto.

The power supply device according to the disclosed embodiment may increase the capacity of the battery while maintaining high safety, and may be realized with high efficiency, low area, and low cost. In addition, the power supply device may be used for a long time, so that it is possible to provide sophisticated services such as a game combining augmented reality and personalized services.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A power supply device for supplying power to load elements, the device comprising:
    a main power module including a main battery;
    a main power controller configured to control charging and discharging of the main power module;
    a sub-power module including sub-batteries respectively corresponding to the load elements; and
    a sub-power controller configured to control charging and discharging of the sub-power module,
    wherein based on a remaining capacity of the main battery and a remaining capacity of the sub-batteries, the power supply device is selectively operated in a first mode in which charging and discharging are possible for both the main power module and the sub-power module, a second mode in which charging and discharging are possible only for the sub-power module, or a third mode in which charging and discharging are possible only for the main power module; and
    wherein the main power controller transforms a power discharged from the main power module and supplies the transformed power to the sub-power module.

2. The power supply device of claim 1, wherein the main power module further comprises at least one power source of a USB power source, an AC power source, and an energy harvester power source,
    wherein the main power controller charges the main battery using power discharged from the at least one power source.

3. The power supply device of claim 1, wherein the main power controller further supplies the transformed power to the load elements.

4. The power supply device of claim 1, wherein an operating voltage and a storage capacity of each of the sub-batteries depend on characteristics of a load element corresponding to each of the sub-batteries.

5. The power supply device of claim 1, wherein the sub-power controller transforms a power discharged from the sub-batteries and supplies the transformed power to the load elements.

6. The power supply device of claim 1, wherein the sub-batteries comprise a first sub-battery and a second sub-battery, and
    wherein the sub-power controller charges the second sub-battery using a power discharged from the first sub-battery.

7. The power supply device of claim 1, wherein when the remaining capacity of the main battery is equal to or greater than a first threshold value and the remaining capacity of each of the sub-batteries is equal to or greater than a second threshold value, the power supply device is operated in the first mode.

8. The power supply device of claim 1, wherein when operating in the first mode, at least one of an operation of charging the main battery, a charging operation of the sub-batteries, and an operation of supplying power to the load elements is performed, wherein the charging operation of the sub-batteries comprises a mutual charging operation between the sub-batteries.

9. The power supply device of claim 1, wherein when the remaining capacity of the main battery is lower than a first threshold value, the power supply device is operated in the second mode.

10. The power supply device of claim 1, wherein when operating in the second mode, at least one of a mutual charging operation between the sub-batteries and an operation of supplying power to the load elements is performed.

11. The power supply device of claim 1, wherein when the remaining capacity of at least one of the sub-batteries is lower than a second threshold value, the power supply device is operated in the third mode.

12. The power supply device of claim 1, wherein when operating in the third mode, at least one of a charging operation of the main battery and an operation of supplying power to the load elements is performed.

13. The power supply device of claim 1, further comprising a second selector configured to select one of a power discharged from the main power controller and a power discharged from the sub-power controller, and output the selected power to the load elements,
wherein the second selector comprises multiplexers respectively corresponding to the load elements.

14. The power supply device of claim 13, wherein when operating in the third mode, the second selector selects a power discharged from the main power controller under a received control signal.

15. The power supply device of claim 1, wherein each of the load elements comprises an AP core, a memory, a peripheral device, a sensor, a display, or an input/output port.

16. A power supply device for supplying power to load elements, the device comprising:
    a main power module including a main battery;
    a main power controller configured to control charging and discharging of the main power module;
    a sub-power module including sub-batteries respectively corresponding to the load elements;
    a sub-power controller configured to control charging and discharging of the sub-power module; and
    a first selector configured to select one of a power discharged from the main power controller and a power discharged from the sub-power controller, and output the selected power to the sub-power module,
    wherein based on a remaining capacity of the main battery and a remaining capacity of the sub-batteries, the power supply device is selectively operated in a first mode in which charging and discharging are possible for both the main power module and the sub-power module, a second mode in which charging and discharging are possible only for the sub-power module, or a third mode in which charging and discharging are possible only for the main power module.

17. The power supply device of claim 16, wherein when operating in the second mode, the first selector selects a power discharged from the sub-power controller under a received control signal.

* * * * *